United States Patent
Usui

(10) Patent No.: US 9,303,142 B2
(45) Date of Patent: Apr. 5, 2016

(54) INKJET RECORDING THAT REDUCES IMAGE QUALITY DETERIORATION DUE TO RE-ADHERING INK

(71) Applicant: KYOCERA Document Solutions Inc., Osaka (JP)

(72) Inventor: Masato Usui, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/523,514

(22) Filed: Oct. 24, 2014

(65) Prior Publication Data
US 2015/0116420 A1   Apr. 30, 2015

(30) Foreign Application Priority Data
Oct. 31, 2013   (JP) .................. 2013-227306

(51) Int. Cl.
| | |
|---|---|
| B41J 2/155 | (2006.01) |
| B41J 2/015 | (2006.01) |
| C08K 5/053 | (2006.01) |
| B41J 2/01 | (2006.01) |
| C08K 5/3415 | (2006.01) |
| B41J 2/21 | (2006.01) |
| C09D 125/14 | (2006.01) |
| C09D 11/10 | (2014.01) |
| C09D 11/322 | (2014.01) |
| C09D 11/40 | (2014.01) |

(52) U.S. Cl.
CPC . *C08K 5/053* (2013.01); *B41J 2/01* (2013.01); *B41J 2/2103* (2013.01); *B41J 2/2146* (2013.01); *C08K 5/3415* (2013.01); *C09D 11/10* (2013.01); *C09D 11/322* (2013.01); *C09D 11/40* (2013.01); *C09D 125/14* (2013.01)

(58) Field of Classification Search
USPC ..................................... 347/20, 42
See application file for complete search history.

(56) References Cited

U.S. PATENT DOCUMENTS

| | | | |
|---|---|---|---|
| 7,971,983 B2 * | 7/2011 | Tonishi et al. ................ 347/100 |
| 2004/0017450 A1 * | 1/2004 | Kawamura ..................... 347/100 |
| 2006/0214962 A1 * | 9/2006 | Takata ............................ 347/14 |

FOREIGN PATENT DOCUMENTS

| | | |
|---|---|---|
| JP | 2005-342897 A | 12/2005 |
| JP | 2007-136879 A | 6/2007 |
| JP | 2010-024313 A | 2/2010 |

OTHER PUBLICATIONS

DISPERBYK-190, Oct. 2012, BYK Additives and Instruments, pp. 1-4.

* cited by examiner

*Primary Examiner* — Jason Uhlenhake
(74) *Attorney, Agent, or Firm* — Stein IP, LLC

(57) ABSTRACT

An ink-jet recording apparatus for recording on a recording sheet with an ink containing at least a pigment, a resin, and water includes at least two color inkjet heads. The at least two color inkjet heads are arranged in a conveyance direction of the recording sheet. The color inkjet head discharges the ink containing resin-encapsulated pigment particles with a largest number average particle diameter among the at least two color inkjet heads is arranged in a most downstream of the conveyance direction of the recording sheet.

5 Claims, 10 Drawing Sheets

FIG. 5

| Material | Mixing Ratio (wt%) |
|---|---|
| Pigment | 15 |
| Resin | 6 to 9 |
| Olfine E1010 | 0.5 |
| Water | Remaining Amount |
| Total | 100.0 |

FIG. 6

| Material | Mixing Ratio (wt%) |
|---|---|
| Pigment Dispersion (Pig. 15%) | 26.6 to 60 |
| Olfine E1010 | 0.5 |
| Triethylene glycol monobutyl ether | 5.0 |
| 2-Pyrrolidone | 5.0 |
| 1,2-Octanediol | 0.5 |
| Glycerin | 15.0 to 30.0 |
| Ion-exchanged Water | Remaining Amount |
| Total | 100.0 |

| Ink | Number Average Particle Diameter (nm) | Dispersion Time (h) | D10 (nm) | D50 (nm) | D90 (nm) |
|---|---|---|---|---|---|
| Y-1 | 141 | 5 | 99.9 | 172 | 296 |
| Y-2 | 120 | 9 | 81.7 | 152 | 277 |
| M-1 | 118 | 7 | 79.5 | 135 | 230 |
| M-2 | 99 | 12 | 68.8 | 113 | 188 |
| C-1 | 103 | 13 | 62.3 | 120 | 229 |
| C-2 | 144 | 4 | 109.3 | 153 | 228 |
| Bk-1 | 157 | 4 | 110.2 | 165 | 269 |
| Bk-2 | 93 | 13 | 53.1 | 103 | 210 |

FIG. 9A

| Ink Set | Used Ink and Head Position | | Number Average Particle Diameter (nm) | Stain Density | Determination |
|---|---|---|---|---|---|
| A | 20a | C-1 | 103 | 0.01 | Good |
| | 20b | M-1 | 118 | | |
| | 20c | Y-1 | 141 | | |
| | 20d | Bk-1 | 157 | | |

FIG. 9B

| Ink Set | Used Ink and Head Position | | Number Average Particle Diameter (nm) | Stain Density | Determination |
|---|---|---|---|---|---|
| B | 20a | C-1 | 103 | 0.03 | Good |
| | 20b | M-1 | 118 | | |
| | 20c | Y-1 | 141 | | |
| | 20d | Bk-2 | 93 | | |

FIG. 10A

| Ink Set | Used Ink and Head Position | | Number Average Particle Diameter (nm) | Stain Density | Determination |
|---|---|---|---|---|---|
| C | 20a | Bk-1 | 157 | 0.02 | Good |
| | 20b | C-1 | 103 | | |
| | 20c | M-1 | 118 | | |
| | 20d | Y-1 | 141 | | |

FIG. 10B

| Ink Set | Used Ink and Head Position | | Number Average Particle Diameter (nm) | Stain Density | Determination |
|---|---|---|---|---|---|
| D | 20a | Bk-2 | 93 | 0.02 | Good |
| | 20b | C-1 | 103 | | |
| | 20c | M-1 | 118 | | |
| | 20d | Y-1 | 141 | | |

FIG. 11A

| Ink Set | Used Ink and Head Position | | Number Average Particle Diameter (nm) | Stain Density | Determination |
|---|---|---|---|---|---|
| E | 20a | Bk-1 | 157 | 0.06 | Fair |
| | 20b | M-1 | 118 | | |
| | 20c | C-1 | 103 | | |
| | 20d | Y-1 | 141 | | |

FIG. 11B

| Ink Set | Used Ink and Head Position | | Number Average Particle Diameter (nm) | Stain Density | Determination |
|---|---|---|---|---|---|
| F | 20a | Bk-1 | 157 | 0.02 | Good |
| | 20b | M-2 | 99 | | |
| | 20c | Y-2 | 120 | | |
| | 20d | C-2 | 144 | | |

FIG. 12A

| Ink Set | Used Ink and Head Position | | Number Average Particle Diameter (nm) | Stain Density | Determination |
|---|---|---|---|---|---|
| G | 20a | Bk-1 | 157 | 0.12 | Poor |
|   | 20b | Y-1 | 141 | | |
|   | 20c | M-1 | 118 | | |
|   | 20d | C-1 | 103 | | |

FIG. 12B

| Ink Set | Used Ink and Head Position | | Number Average Particle Diameter (nm) | Stain Density | Determination |
|---|---|---|---|---|---|
| H | 20a | Bk-1 | 157 | 0.10 | Poor |
|   | 20b | Y-1 | 141 | | |
|   | 20c | C-1 | 103 | | |
|   | 20d | M-1 | 118 | | |

FIG. 12C

| Ink Set | Used Ink and Head Position | | Number Average Particle Diameter (nm) | Stain Density | Determination |
|---|---|---|---|---|---|
| I | 20a | Bk-1 | 157 | 0.13 | Poor |
|   | 20b | M-1 | 118 | | |
|   | 20c | Y-1 | 141 | | |
|   | 20d | C-1 | 103 | | |

INKJET RECORDING THAT REDUCES IMAGE QUALITY DETERIORATION DUE TO RE-ADHERING INK

INCORPORATION BY REFERENCE

This application is based upon, and claims the benefit of priority from, corresponding Japanese Patent Application No. 2013-227306 filed in the Japan Patent Office on Oct. 31, 2013, the entire contents of which are incorporated herein by reference.

BACKGROUND OF THE INVENTION

Unless otherwise indicated herein, the description in this section is not prior art to the claims in this application and is not admitted to be prior art by inclusion in this section.

There are provided techniques in which inks are arranged in an order specified in a predetermined parameter to be discharged so as to ensure an improved quality of an image formed by these inks (image quality). One technique specifies the ink order based on a ratio of a surface tension to a viscosity. Another technique specifies the ink order based on the viscosities.

SUMMARY OF THE INVENTION

An ink-jet recording apparatus for recording on a recording sheet with an ink containing at least a pigment, a resin, and water according to an aspect of the disclosure includes at least two color inkjet heads. The at least two color inkjet heads are arranged in a conveyance direction of the recording sheet. The color inkjet head discharges the ink containing resin-encapsulated pigment particles with a largest number average particle diameter among the at least two color inkjet heads is arranged in a most downstream of the conveyance direction of the recording sheet.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 5 illustrates a composition of a pigment dispersion according to a working example of the disclosure;

FIG. 6 illustrates a composition table of an ink according to the working example;

FIG. 9A illustrates conditions and results of Evaluation 1 according to the working example;

FIG. 9B illustrates conditions and results of Evaluation 2 according to the working example;

FIG. 10A illustrates conditions and results of Evaluation 3 according to the working example;

FIG. 10B illustrates conditions and results of Evaluation 4 according to the working example;

FIG. 11A illustrates conditions and results of Evaluation 5 according to the working example;

FIG. 11B illustrates conditions and results of Evaluation 6 according to the working example;

FIG. 12A illustrates conditions and results of Evaluation 7 according to the working example;

FIG. 12B illustrates conditions and results of Evaluation 8 according to the working example; and FIG. 12C illustrates conditions and results of Evaluation 9 according to the working example.

DETAILED DESCRIPTION OF THE EMBODIMENTS

Figure 1:
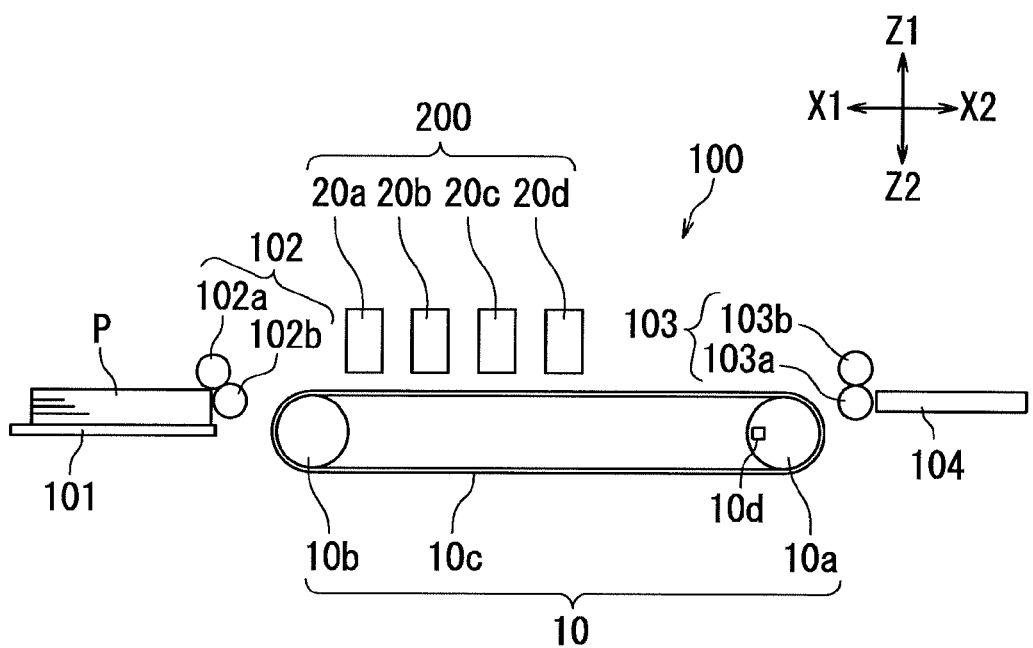
FIG. 1 illustrates an ink-jet recording apparatus (especially a configuration for an ink discharge) according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Hereafter, a description will be given of an embodiment of the disclosure with reference to the attached drawings.

Firstly, with reference to mainly FIG. 1, a configuration and an operation of an ink-jet recording apparatus according to the embodiment will be described. FIG. 1 illustrates the ink-jet recording apparatus (especially the configuration for an ink discharge) according to the embodiment.

As illustrated in FIG. 1, the ink-jet recording apparatus according to the embodiment is a printer 100. The printer 100 discharges ink onto a recording sheet to form an image based on such as an image data and a print condition (including enabling or disabling of a duplex printing) received from external computers. The printer 100 is such as a color printer.

The printer 100 includes a sheet feed cassette 101. A paper P is set in the sheet feed cassette 101. The paper P is such as a plain paper. In the embodiment, the paper P corresponds to the recording sheet.

The sheet feed cassette 101 includes a paper feeder 102. The paper feeder 102 is constituted of a roller 102a, which is driven by a motor, and a roller 102b, which is brought into pressure contact by the roller 102a to be driven. The paper feeder 102 separates the paper P, which is set in the sheet feed cassette 101, one by one and sends it out to a conveyance unit 10.

The conveyance unit 10 includes rollers 10a and 10b, and a conveyance belt 10c. The conveyance belt 10c is wound around the rollers 10a and 10b that are spaced apart from each other, and accordingly the conveyance belt 10c is tightly stretched. The conveyance belt 10c rotates corresponding to the rotation of the rollers 10a and 10b located in both ends. In the embodiment, the only roller 10a arranged in a downstream side of the conveyance direction of paper (X2 side) among the rollers 10a and 10b is driven. In the embodiment, for example, a voltage is applied to the roller 10a or the roller 10b to generate an alternating electric field, which causes the conveyance belt 10c to electrostatically absorbed the paper P. The electrostatic adsorption can be cancelled by grounding the roller 10a or the roller 10b. The roller 10a includes an encoder 10d. The encoder 10d outputs a pulse train corresponding to the rotational displacement amount of a rotation shaft of the roller 10a. A tension roller may be located for the conveyance belt 10c if necessary. The paper P may be absorbed onto the conveyance belt 10c by suction instead of the electrostatic adsorption.

The roller 10a is driven by a motor. As the roller 10a rotates, its rotary force is transferred to the roller 10b via the conveyance belt 10c, and consequently the roller 10b rotates (driven). The conveyance belt 10c rotates corresponding to the rotation of the rollers 10a and 10b. As a result, the paper P, which is absorbed onto the conveyance belt 10c, is conveyed from upstream (X1 side) to downstream (X2 side) of a conveyance direction of paper.

An image forming unit 200 is located above the conveyance unit 10 (Z1 side). While the conveyance unit 10 conveys the paper P, the ink is discharged toward the paper P from the image forming unit 200 to form (record) the image on one surface (recording surface) of the paper P.

A discharge device 103 is located near a downstream end (end portion of side X2) of the conveyance unit 10 in the conveyance direction of paper. A sheet discharge tray 104 is located at the downstream side of the discharge device 103 in the conveyance direction of paper. The discharge device 103 is constituted of a roller 103a, which is driven by a motor, and a roller 103b, which is brought into pressure contact by the roller 103a to be driven. The paper P on which an image formation has been performed is conveyed to the discharge device 103 by the conveyance unit 10 and is discharged to the sheet discharge tray 104 by the discharge device 103. The discharged paper P is stacked in the sheet discharge tray 104.

In the embodiment, after the ink discharge, a printing surface (recording surface) of the paper P (recording sheet) comes into contact with the rollers 103a and 103b (conveyance roller). In the embodiment, before penetrating or drying of ink, the printing surface of the paper P also comes into contact with the rollers 103a and 103b. The above-described configuration ensures to enhance a printing speed (throughput) by conveying the paper P without waiting for completion of ink penetrating or drying. Unfortunately, on the other hand, the ink adhering to the conveyance roller is re-adhering to the surface of a following paper being fed, and this increases the possibility of image quality deterioration.

The image forming unit 200 is constituted of line heads 20a, 20b, 20c, and 20d that discharge inks of four different colors from one another. In the following, when it is unnecessary to distinguish the line heads 20a, 20b, 20c, and 20d from each other (when discussing such as common property), the line heads 20a, 20b, 20c, and 20d are each described as a line head 20.

Figure 2:
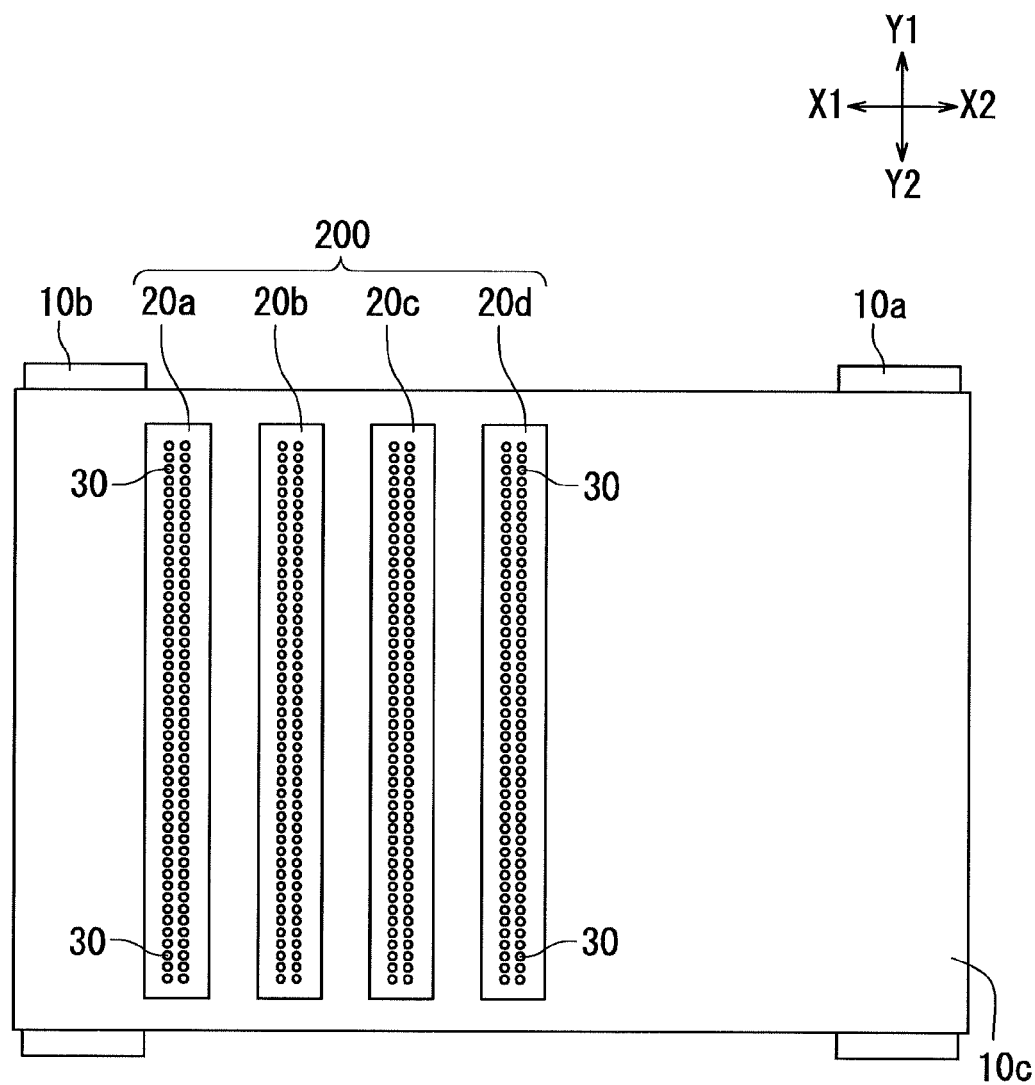
FIG. 2 illustrates respective line heads that constitute an image forming unit according to the one embodiment.

Next, with reference to mainly FIG. 2, the configuration of the image forming unit 200 will be described. FIG. 2 illustrates the respective line heads that constitute the image forming unit 200.

Each line head 20 is a line type inkjet head. Each line head 20 corresponds to a long inkjet head. Each line head 20 is disposed extending in a width direction (Y direction) perpendicular to the conveyance direction of paper (X direction). Each line head 20 preferably has a greater length than the width of the paper P. This ensures the image formation at a time entirely in the width direction.

In the embodiment, the line heads 20 each include a plurality of discharging units 30. The discharging units 30 are arranged in the Y direction. The discharging units 30, for example, are formed of 166 pieces in each line head 20 (per head) and 664 pieces in total (sum total of the four heads). The discharging units 30 in each line head 20 have a pitch of 150 dpi or similar value to be set. Additionally, a dot density as a whole (total of the four heads) is 600 dpi by shifting one-quarter of pitch neighboring each line head 20.

Each line head 20 discharges the ink by the respective discharging units 30 corresponding to an image signal. The ink discharge method includes a piezo system that discharges ink using a piezoelectric element. However, it is not limited to the above system, and any ink discharge method may be employed for the image forming unit 200. A thermal inkjet printing system may be applicable, which discharges ink by generating bubble with heating element to apply pressure to the ink.

In the embodiment, the line heads 20a, 20b, 20c, and 20d are filled with the inks of any one of different colors (yellow (Y), magenta (M), cyan (C), and black (Bk)). The inks, which are used for the printer 100 according to the embodiment, are water based inks and contain water. The inks also contain resin-encapsulated pigment particles (hereinafter referred to as coated particle). In the following, the ink in color other than black is referred to as a color ink.

In the embodiment, the inks (ink Y, ink M, ink C, and ink Bk), which are filled into the respective line heads 20, each contain a pigment, a resin, an organic solvent, and water. Here, the line heads 20 that discharge the color inks (ink Y, ink M, and ink C) among the line heads 20 are each referred to as a color inkjet head. A color inkjet head, which discharges the ink containing the coated particles with the largest number average particle diameter, among the color inkjet heads is arranged at the most downstream of the conveyance direction of paper.

In the printer 100 according to the embodiment, the line heads 20 discharge the ink successively in order of position to form the image on the paper P (recording sheet). Specifically, in the embodiment, the respective line heads 20 are arranged in the order corresponding to the line head 20a, 20b, 20c, and 20d from the upstream (X1 side) toward the downstream (X2 side) of the conveyance direction of paper, and discharge the ink in order of the above listed. This ensures that the inks of four colors (ink Y, ink M, ink C, and ink Bk) can be discharged to the same positions of the paper P. As a result, a full-color image can be formed (recorded) on the paper P. In addition, the printer 100 can form (record) a monochrome image as well.

Figure 3A:
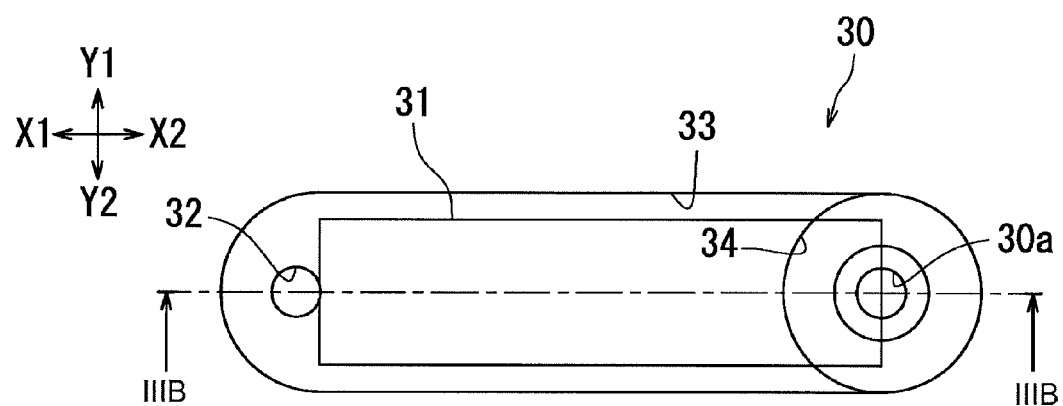
FIG. 3A illustrates a discharging unit of the line head according to the one embodiment.
Figure 3B:
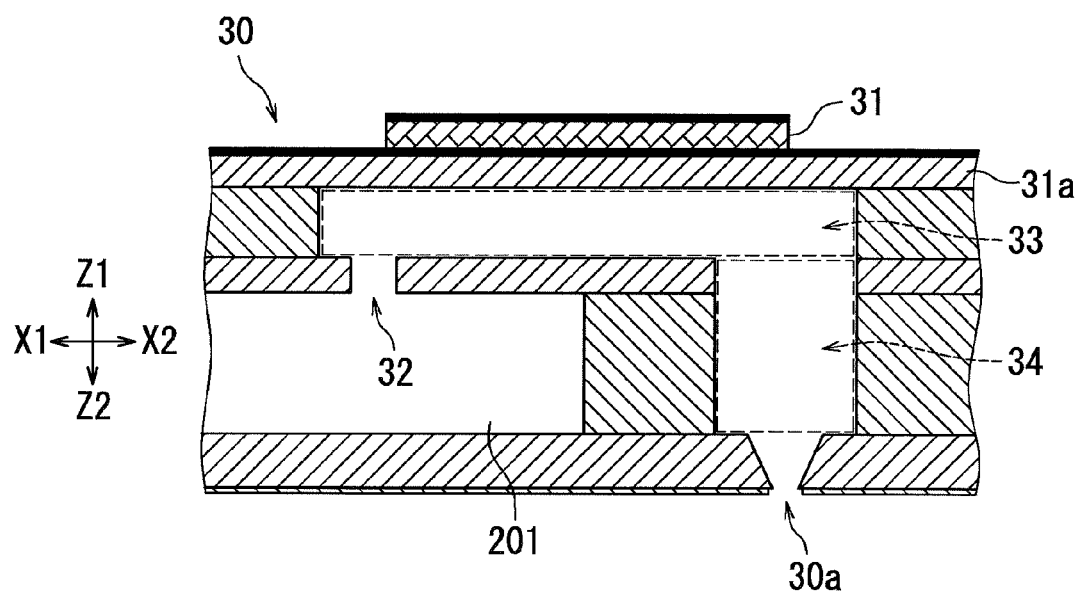
FIG. 3B illustrates a cross-section taken along the line IIIB-IIIB in FIG. 3A.

Next, with reference to mainly FIG. 3A and FIG. 3B, the configuration of the discharging unit 30 will be described. FIG. 3A illustrates the discharging unit 30. FIG. 3B is a cross-sectional view taken along the line IIIB-IIIB in FIG. 3A.

As illustrated in FIG. 3A and FIG. 3B, the discharging unit 30 includes a nozzle 30a, an actuator 31, a vibration plate 31a, a hole 32, a pressurization chamber 33, and a nozzle channel 34. The hole 32, the pressurization chamber 33, the nozzle channel 34, and the nozzle 30a are made to communicate with one another. The pressurization chamber 33 of the discharging unit 30 is communicated with a common channel 201 via the hole 32. The ink is supplied to the common channel 201 from an ink tank (not illustrated) by pump.

The actuator 31 includes a piezoelectric element. Applying voltage to the piezoelectric element (actuator 31) causes the piezoelectric element to deform with inverse piezoelectric effect. The deformation of the piezoelectric element is transmitted to the pressurization chamber 33 via the vibration plate 31a. This causes the pressurization chamber 33 to be compressed. The ink is transferred from the common channel 201 through the hole 32 to the pressurization chamber 33. Subsequently, the ink is pressurized by the actuator 31 in the pressurization chamber 33, passes through the nozzle channel 34, and is discharged from the nozzle 30a.

The pressurization chamber 33 has, for example, an area (X-Y plane) of 0.2 mm$^2$, a width (Y direction) of 200 µm, and a depth (Z direction) of 100 µm. The nozzle channel 34 has, for example, a diameter of 200 µm and a length (Z direction) of 800 µm. The hole 32 (the narrowest part) has, for example, a diameter of 30 µm and a length (Z direction) of 40 µm. The nozzle 30a has, for example, a length (Z direction) of 30 µm. A discharge opening of the nozzle 30a (X-Y plane) has, for example, a shape and size of a circular shape with a radius of 10 µm.

Figure 4:
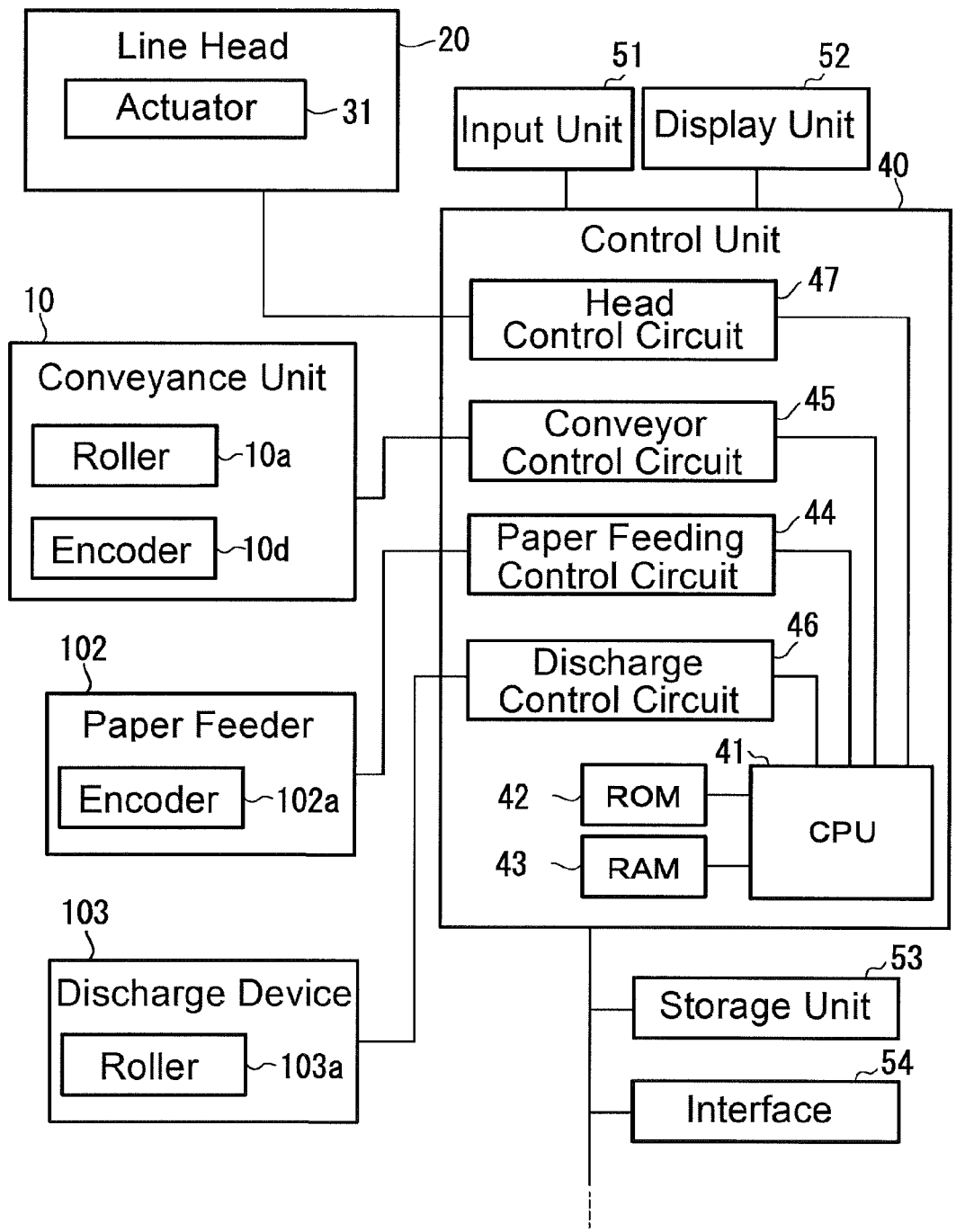
FIG. 4 illustrates a configuration for an electronic control of the ink-jet recording apparatus according to the one embodiment.

Next, with reference to mainly FIG. 4, the configuration for an electronic control of the printer 100 will be described. FIG. 4 illustrates the configuration for the electronic control of the printer 100 in a block diagram.

As illustrated in FIG. 4, a control unit 40 includes a Central Processing Unit (CPU) 41, a Read Only Memory (ROM) 42, a Random Access Memory (RAM) 43, a paper feeding control circuit 44, a conveyor control circuit 45, a discharge control circuit 46, and a head control circuit 47.

The ROM 42 consists of a Programmable ROM (PROM) such as a flash memory. The ROM 42 mainly stores a Basic Input/Output System (BIOS), an Operating System (OS), various drivers, and programs for various applications. The RAM 43 consists of such as a Dynamic RAM (DRAM).

The CPU 41 controls the paper feeder 102, which is a motor driving the roller 102a, through the use of the paper feeding control circuit 44. The CPU 41 controls the discharge device 103, which is a motor driving the roller 103a, using the discharge control circuit 46.

The CPU 41 receives such as output signal of the encoder 10d from the conveyance unit 10. The CPU 41 controls the conveyance unit 10, which is a motor driving the roller 10a, using the conveyor control circuit 45. The conveyor control circuit 45 applies the voltage for the electrostatic absorption to the roller 10a or the roller 10b. The CPU 41 counts the pulse, which is included in the output signal of the encoder 10d, to obtain a rotational amount of the roller 10a and thereby a paper feed rate (sheet position).

The CPU 41 controls the line head 20 (such as actuator 31) using the head control circuit 47.

The control unit 40 is communicatively connected to an input unit 51, a display unit 52, a storage unit 53, and an interface 54, individually.

The input unit 51 includes a keyboard, a mouse, or a touch panel. The display unit 52 is constituted of a display such as a Liquid Crystal Display (LCD) or an Electro Luminescence Display (ELD). Where the input unit 51 and display unit 52 are each constituted of a touch panel, the input unit 51 and the display unit 52 are integrated.

The storage unit 53 includes a nonvolatile memory such as a hard disk. The storage unit 53 stores the image data for printing, the programs for various controls, and data used in the programs.

The interface 54 enables the data transmission and reception between the control unit 40 and an external device. The control unit 40 is connected to general-purpose computers (so-called personal computer) or similar unit via the interface 54. The control unit 40 mainly controls the paper feeder 102, the conveyance unit 10, the line head 20, and the discharge device 103 based on the image data and the print condition received via the interface 54.

Hereinafter, with reference to mainly FIG. 1, advantageous effects derived from the printer 100 according to the embodiment will be described.

In the printer 100, when the paper P passes through the rollers 103a and 103b after the process of the image formation (ink discharge), the ink on the paper P, which is yet to be penetrated and dried completely, may adhere to the roller 103a or the roller 103b. The ink adhering to the roller 103a or the roller 103b adheres (re-adhere) to the following paper P being fed, and this may cause image quality deterioration.

When the coated particle included in the ink (resin-encapsulated pigment particle) has the larger diameter, the coated particle has the smaller specific surface than the case where the coated particle has the smaller diameter. Thus, the ink, which contains the coated particle having the larger diameter, is less likely to be adhering to the conveyance roller (such as roller 103a or roller 103b). When the coated particle included in the ink has the larger diameter, such ink property reduces the tendency to cause the ink to re-adhere to the paper P via the conveyance roller.

The time required for penetrating and drying of ink is shortened as toward the downstream side of the conveyance direction of paper, thus increasing the possibility of the ink re-adhering to the paper P via the conveyance roller. For a high speed printing in particular, the time required for ink penetrating and drying is shortened, thus increasing the possibility of the ink re-adhering (and thereby image quality deterioration).

Therefore, in the printer 100 according to the embodiment, the color inkjet head, which discharges the ink containing the coated particle with the largest number average particle diameter, among the color inkjet heads is arranged at the most downstream of the conveyance direction of paper. Such arrangement of the color inkjet heads causes the ink, which contains the coated particles with the largest number average particle diameter, among the color inks to be discharged lastly.

With the above-described configuration in the printer 100 according to the embodiment, the ink discharged (discharged lastly) at the most downstream of the conveyance direction of paper, where penetration or dry is likely to be insufficient, contains the coated particle with the largest diameter (number average particle diameter). As described above, the ink containing the coated particle with larger diameter is less likely to adhere to the conveyance roller. And thus, in the printer 100 according to the embodiment, the ink adhering to the conveyance roller, as well as the ink re-adhering to the paper P via the conveyance roller is reduced. As a result, a print quality deterioration due to the ink re-adhering can be reduced.

Working Examples

In the following, working examples of the disclosure will now be described. The disclosure will not be limited to the working examples described below.

In the working example, a pigment dispersion was prepared, and then the inks were prepared with the prepared pigment dispersion. Specifically, regarding the four colors of yellow (Y), magenta (M), cyan (C), and black (Bk), the corresponding inks are prepared, which contain the coated particles having the different number average particle diameters from one another. Then, the print qualities under respective conditions were evaluated by changing the inks used in the respective heads (line heads 20a, 20b, 20c, and 20d) of the printer 100 (see FIGS. 1 to 4).

Resin for Pigment Dispersion

The pigment dispersion according to the working example consists of the pigment, the resin, a surfactant, and water. Hereinafter, the resin contained in the pigment dispersion, which is sometimes simply referred to as "resin," will be described.

In the working example, as the resin, a water-soluble resin (alkali-soluble resin), which was neutralized with an equivalent of KOH, was used.

The resin preferably has an acid value ranging from 150 to 300. When the acid value is lower than 150, this may cause the poor dispersibility of pigments and the difficulties in forming the coated particle into fine particle. On the other hand, when the acid value is higher than 300, this may cause the poor storage stability of the ink.

To improve the print quality, the pigment particle is preferably coated with the resin having a molecular weight of tens of thousands.

To form the high-quality image, the coated particle is preferably the fine particle. The property of color development or coloring tends to be better by forming the coated particle into fine particle.

From the above-described perspective, the resin preferably includes styrene acrylic resin. Therefore, the styrene acrylic resin was used as the resin in the working example.

In the working example, the styrene acrylic resin was prepared using a macromonomer synthesis method. The macromonomer synthesis method is known for a polymerization method executable with ease and stability. In the working example, the styrene acrylic resin was prepared as following procedures.

AS-6 manufactured by Toagosei Co., Ltd. was obtained. An additional monomers were added to AS-6 so as to conform to a proportion of the resin. AS-6 has a (meth) acryloyl group bonded to one of molecular terminals of a polystyrene. AS-6 is an Oligomer having a number average molecular weight (Mn) of 6000.

Next, the above-described monomers were polymerized in a methyl ethyl ketone (MEK) as a solvent using an initiator. After the reaction, the solvent was distilled off under reduced pressure. An azo compound such as 2,2'-azobisisobutyronitrile, or 2,2'-azobis (2,4-dimethylvaleronitrile) can be used as the initiator.

Further, for the obtained resin as described above, a weight average molecular weight (Mw) was measured by a gel permeation chromatography. The acid value was measured by an automated potentiometric titration device.

In the working example, the styrene acrylic resin having the weight average molecular weight (Mw) of about 50,000 and the acid value of about 150 was prepared using the above-described methods.

Preparation Method for Pigment Dispersion

In the working example, the pigment dispersion was prepared using the obtained resin (styrene acrylic resin) as described above. Hereinafter, with reference to mainly FIG. 5, a preparation method for the pigment dispersion according to the working example will be described. FIG. 5 illustrates a composition table of the pigment dispersion according to the working example.

In the working example, the pigment, the resin, Olfine E1010 (surfactant), and water were blended at the ratio as illustrated in FIG. 5. A mixing ratio (unit: wt %, total: 100) is described below.

Pigment: 15
Resin: 6 to 9
Olfine E1010: 0.5
Water: Remaining amount (75.5 to 78.5)

In the working example, the ratio of the resin with respect to the pigment (amount of resin/amount of pigment) was adjusted so as to be ranged from 0.4 to 0.6. However, it is not limited to the above, and any ratio of the resin with respect to the pigment may be employed.

Next, the above-described mixture (see FIG. 5) was kneaded by a media type dispersing machine (wet-type dispersing machine). Thus, the pigment dispersion is formed. The pigment dispersion contains the coated particles. Such as NANO GRAIN MILL (manufactured by Asada Iron Works Co., Ltd.), MSC-MILL (manufactured by Nippon Coke & Engineering Co., Ltd.), or DYNO-MILL (manufactured by Shinmaru Enterprises Co., Ltd.) may be used as a disperser.

Conditions for kneading (dispersion), zirconia beads (submillimeter beads) having the diameter of 0.5 to 1.0 mm were set in a vessel of the disperser (pulverizing vessel). Use of the submillimeter beads facilitates to form fine particles, and enhances covering of the pigment particle with the resin for the coated particle.

Varying the diameter size of the beads used in the disperser ensures variation of a dispersion degree of the coated particle, an amount of free resin, or a particle diameter. In the working example, varying the diameter size of the beads used in the disperser controlled the number average particle diameter of the coated particle so as to cause the respective inks to contain the coated particles having the number average particle diameters different from one another (see FIG. 7 as described below). Further, in the working example, varying the dispersion time controlled the dispersion degree of the coated particle. The longer the dispersion time is, the higher the dispersibility becomes.

Preparation Method for Ink

In the working example, the ink was prepared using the obtained pigment dispersion as described above. Hereinafter, with reference to mainly FIG. 6, the preparation method for the ink according to the working example will be described. FIG. 6 illustrates the composition table of the ink according to the working example.

In the working example, the pigment dispersion (pigment contained 15%), Olfine E1010 (surfactant), triethylene glycol monobutyl ether, 2-pyrrolidone, 1,2-octanediol, glycerin, and the ion-exchanged water were blended at the ratio as illustrated in FIG. 6. The mixing ratio (unit: wt %, total: 100) is described below.

Pigment Dispersion: 26.6 to 60.0
Olfine E1010: 0.5
Triethylene glycol monobutyl ether: 5.0
2-Pyrrolidone: 5.0
1,2-Octanediol: 0.5
Glycerin: 15.0 to 30.0
Ion-exchanged Water: Remaining amount Triethylene glycol monobutyl ether, 2-pyrrolidone, 1,2-octanediol, and glycerin correspond to humectants or penetration enhancers (organic solvents). The ratio of the pigment dispersion was adjusted such that the proportion of the pigment ranged from 4 to 9% with respect to the total amount of the ink. The ratio of glycerin and the ion-exchanged water was adjusted such that the ink had a viscosity of 6 mPa·s.

Next, the above-described mixture (see FIG. 6) was sufficiently agitated and then filtered under pressure with a filter. Thus, the ink (recording liquid) was obtained.

Used Ink in Evaluation

Figures 7, 8:
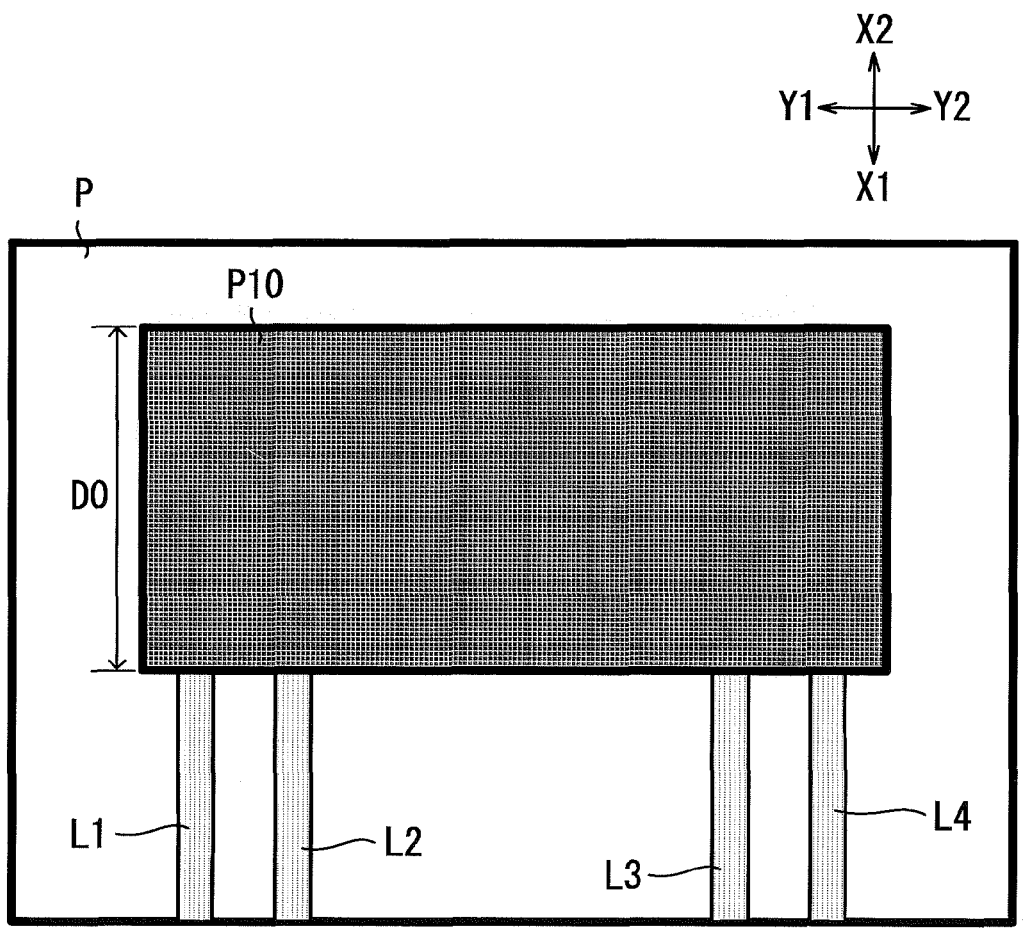
FIG. 7 illustrates specifications (number average particle diameter of coated particle, dispersion time, and particle size distribution data) of the inks used in an evaluation in the working example.
FIG. 8 illustrates an evaluation method of the working example.

Hereinafter, with reference to mainly FIG. 7, the ink used in an evaluation according to the working example will be described. FIG. 7 illustrates a table for the following specifications of the ink used in the evaluation in the working example; the number average particle diameter of the coated particle, the dispersion time during the preparation for the pigment dispersion, and the particle size distribution data for the coated particles (D10, D50, and D90).

In the working example, as illustrated in FIG. 7, the inks of eight colors (Y-1, Y-2, M-1, M-2, C-1, C-2, Bk-1, and Bk-2) prepared by the above-described methods were used in the evaluation. The inks of Y-1 and Y-2 are each a yellow ink (Y). The inks of M-1 and M-2 are each a magenta ink (M). The inks of C-1 and C-2 are each a cyan ink (C). The inks of Bk-1 and Bk-2 are each a black ink (Bk).

The number average particle diameter is an average value of the particle diameter with respect to the number of particle. The particle size distribution data of D10, D50, and D90 in FIG. 7 correspond to the particle diameters at weight accumulated values in the particle size distribution (cumulative distribution) of 10%, 50%, and 90%, respectively. The particle size distribution data of D10, D50, and D90 serve as an index of the degree of the dispersibility. In the working example, regarding a solution obtained by 300-fold dilution of the ink with the ion-exchanged water, the number average particle diameter of the coated particle and the particle size distribution data of D10, D50, and D90 were measured by Zetasizer Nano ZS (particle size measurements apparatus) manufactured by Malvern Instruments Ltd.

Evaluation Method

Hereinafter, with reference to mainly FIG. 8, an evaluation method according to the working example will be described.

In the evaluation of the working example, the above-described inks (see FIG. 7) were filled into the image forming unit 200 (the line heads 20a, 20b, 20c, and 20d) in the printer 100 (see FIGS. 1 to 4). Consequently, as illustrated in FIG. 8, the image forming unit 200 formed a rectangular-shaped pattern P10 (evaluation image) with a width D0 of 150 mm. When forming the pattern P10, a discharge amount of each of the color inks (Y, M, and C) was set to 100% (maximum). The paper P used in the evaluation is IJW in A4 size paper manufactured by Oji Paper Co., Ltd.

The pattern P10 was formed (printed) in 15,000 sheets of the paper P as described above. And then, a stain density of the 15,000th sheet of the paper P was measured. Specifically, there are four portions, along which the conveyance rollers (rollers of 103a and 103b in the printer 100) pass, within a blank sheet area (outside the pattern P10 area) in the paper P. In the above four portions, four lines of L1, L2, L3, and L4 are formed due to the ink re-adhering as illustrated in FIG. 8. With respect to the measurement of the stain density, a reflection density of the respective lines of L1, L2, L3, and L4 were measured by a densitometric device (SpectroEye LT manufactured by SAKATA INX ENG. CO., LTD.). The highest value of the above reflection densities was defined as an offset density (evaluation index). It has been observed that the ink adhering to the conveyance roller has dried, solidified, and then peeled off from the conveyance roller after completion of printing followed by a certain amount of time passing. Therefore, it can be assumed that the ink will not accumulate on the surface of the conveyance roller if the value of the reflection density (offset density) is less than 0.05.

Evaluation Results

Hereinafter, with reference to mainly FIGS. 9A to 12C, the evaluation method according to the working example will be described. FIGS. 9A to 12C each illustrate the table for the results of the evaluation. In FIGS. 9A to 12C, each determination with respect to the resulting value of reflection density (offset density) was recorded as follows: "Good" for being less than 0.04; "Fair" for being equal to or more than 0.04 and less than 0.08; and "Poor" for being equal to or more than 0.08. The determination of "Good" (less than 0.04) corresponds to the case where there is very little possibility that a defect being confirmed through visual observation will occur. The determination of "Fair" (0.04 to 0.08) corresponds to the case where the image quality deterioration will occur only if a continuous printing has been performed. The determination of "Poor" (no less than 0.08) corresponds to the case where the image quality deterioration at a visible level is more likely to occur, though depending on a print frequency. In the respective lines L1 to L4, a variation of the image quality (the stain density) in the line hardly occurred.

Evaluation 1

Hereinafter, with reference to mainly FIG. 9A, the conditions and results of Evaluation 1 (including stain density) will be described. As illustrated in FIG. 9A, for Evaluation 1 (ink set A), the line heads 20a, 20b, 20c, and 20d discharged the inks C-1, M-1, Y-1, and Bk-1, respectively. The value of the stain density (offset density), which was measured under such conditions, was 0.01. The determination result is "Good".

Evaluation 2

Hereinafter, with reference to mainly FIG. 9B, the conditions and results of Evaluation 2 (including stain density) will be described. As illustrated in FIG. 9B, the condition of Evaluation 2 is approximately the same as that of Evaluation 1. However, for Evaluation 2 (ink set B), the ink Bk-2 was used for the line head 20d. The value of the stain density (offset density), which was measured under such conditions, was 0.03. The determination result is "Good".

Evaluation 3

Hereinafter, with reference to mainly FIG. 10A, the conditions and results of Evaluation 3 (including stain density) will be described. As illustrated in FIG. 10A, for Evaluation 3 (ink set C), the line heads 20a, 20b, 20c, and 20d discharged the inks Bk-1, C-1, M-1, and Y-1, respectively. The value of the stain density (offset density), which was measured under such conditions, was 0.02. The determination result is "Good".

Evaluation 4

Hereinafter, with reference to mainly FIG. 10B, the conditions and results of Evaluation 4 (including stain density) will be described. As illustrated in FIG. 10B, the condition of Evaluation 4 is approximately the same as that of Evaluation 3. However, for Evaluation 4 (ink set D), the ink Bk-2 was used for the line head 20a. The value of the stain density (offset density), which was measured under such conditions, was 0.02. The determination result is "Good".

Evaluation 5

Hereinafter, with reference to mainly FIG. 11A, the conditions and results of Evaluation 5 (including stain density) will be described. As illustrated in FIG. 11A, for Evaluation 5 (ink set E), the line heads 20a, 20b, 20c, and 20d discharged the inks Bk-1, M-1, C-1, and Y-1, respectively. The value of the stain density (offset density), which was measured under such conditions, was 0.06. The determination result is "Fair".

Evaluation 6

Hereinafter, with reference to mainly FIG. 11B, the conditions and results of Evaluation 6 (including stain density) will be described. As illustrated in FIG. 11B, for Evaluation 6 (ink set F), the line heads 20*a*, 20*b*, 20*c*, and 20*d* discharged the inks Bk-1, M-2, Y-2, and C-2, respectively. The value of the stain density (offset density), which was measured under such conditions, was 0.02. The determination result is "Good".

Evaluation 7

Hereinafter, with reference to mainly FIG. 12A, the conditions and results of Evaluation 7 (including stain density) will be described. As illustrated in FIG. 12A, for Evaluation 7 (ink set G), the line heads 20*a*, 20*b*, 20*c*, and 20*d* discharged the inks Bk-1, Y-1, M-1, and C-1, respectively. The value of the stain density (offset density), which was measured under such conditions, was 0.12. The determination result is "Poor".

Evaluation 8

Hereinafter, with reference to mainly FIG. 12B, the conditions and results of Evaluation 8 (including stain density) will be described. As illustrated in FIG. 12B, for Evaluation 8 (ink set H), the line heads 20*a*, 20*b*, 20*c*, and 20*d* discharged the inks Bk-1, Y-1, C-1, and M-1, respectively. The value of the stain density (offset density), which was measured under such conditions, was 0.10. The determination result is "Poor".

Evaluation 9

Hereinafter, with reference to mainly FIG. 12C, the conditions and results of Evaluation 9 (including stain density) will be described. As illustrated in FIG. 12C, for Evaluation 9 (ink set I), the line heads 20*a*, 20*b*, 20*c*, and 20*d* discharged the inks Bk-1, M-1, Y-1, and C-1, respectively. The value of the stain density (offset density), which was measured under such conditions, was 0.13. The determination result is "Poor".

Examination for Evaluations 1 to 9

Hereinafter, with reference to mainly FIGS. 9A to 12C, the results of Evaluations 1 to 9 will be examined.

In Evaluations 1 to 6, the color inkjet head (hereinafter referred to as the largest particle head) that discharges the ink containing the coated particles (resin-encapsulated pigment particle) including resin with the largest number average particle diameter among the color inkjet heads in the printer 100 is arranged in the most downstream of the conveyance direction of paper. On the other hand, in Evaluations 7 to 9, the color inkjet heads are disposed differently from the above arrangement.

In Evaluation 1, for example, as illustrated in FIG. 9A, the line heads 20*a*, 20*b*, and 20*c* correspond to the color inkjet heads. The line head 20*c*, which discharges the ink Y-1 having the number average particle diameter value of 141, corresponds to the largest particle head. The line head 20*c* is arranged in the downstream of the line heads 20*a* and 20*b* (see FIG. 1) in the conveyance direction of paper.

In Evaluation 6, for example, as illustrated in FIG. 11B, the line heads 20*b*, 20*c*, and 20*d* correspond to the color inkjet heads. The line head 20*d*, which discharges the ink C-2 having the number average particle diameter value of 144, corresponds to the largest particle head. The line head 20*d* is arranged in the downstream of the line heads 20*b* and 20*c* (see FIG. 1) in the conveyance direction of paper.

While the detailed description for Evaluations 2 to 5 is omitted, as illustrated in FIGS. 9B to 11A, also in Evaluations 2 to 5, the largest particle head among the color inkjet heads is arranged at the most downstream in the conveyance direction of paper.

Meanwhile, in Evaluation 7, for example, as illustrated in FIG. 12A, the line heads 20*b*, 20*c*, and 20*d* correspond to the color inkjet heads. The line head 20*b*, which discharges the ink Y-1 having the number average particle diameter value of 141, corresponds to the largest particle head. The line head 20*b* is arranged in the upstream of the line heads 20*c* and 20*d* in the conveyance direction of paper (see FIG. 1).

While the detailed description for Evaluations 8 and 9 is omitted, as illustrated in FIGS. 12B and 12C, also in Evaluations 8 and 9, the largest particle head among the color inkjet heads is not arranged at the most downstream in the conveyance direction of paper.

In the working example, as illustrated in FIGS. 9A to 11B, the determination results of Evaluations 1 to 6 were "Fair" or "Good". On the other hand, the determination results of Evaluations 7 to 9 were "Poor" as illustrated in FIGS. 12A to 12C. Thus, in Evaluations 1 to 6, the higher image quality was obtained than that of Evaluations 7 to 9. This is considered because the inks discharged from the color inkjet heads at the most downstream of the conveyance direction of paper, where penetration or dry is likely to be insufficient, contain the coated particles having the largest diameter. This reduces the ink adhering to the conveyance roller, eventually the ink re-adhering to the paper P via the conveyance roller.

In the working example, as illustrated in FIGS. 9A to 11B, the determination results of Evaluations of 1, 2, 3, 4, and 6 were "Good", and that of Evaluation 5 was "Fair". In the following, this will now be examined.

In Evaluations 1 to 4, as illustrated in FIGS. 9A to 10B, the respective color inks are discharged in the order corresponding to the inks C-1, M-1, and Y-1 (the number average particle diameter values of 103, 118, and 141 nm, respectively). In Evaluation 6, as illustrated in FIG. 11B, the respective color inks are discharged in the order corresponding to the inks M-2, Y-2, and C-2 (the number average particle diameter values of 99, 120, and 144 nm, respectively). Thus, in Evaluations 1, 2, 3, 4, and 6, the larger the number average particle diameters of the coated particles (resin-encapsulated pigment particle) discharged by the color inkjet heads in the printer 100 are, the more downstream the color inkjet head are arranged in the conveyance direction of paper. Accordingly, the more downstream the color inks are discharged in the conveyance direction of paper, the larger the number average particle diameters of the coated particles in the color inks become. Meanwhile, in Evaluation 5, the color inkjet heads are arranged differently from the above arrangement. Such different configurations for the evaluations prove that the print quality deteriorations due to the ink re-adhering in Evaluations 1, 2, 3, 4, and 6 were further reduced compared with Evaluation 5.

In the working example, as illustrated in FIGS. 9A to 10B, even if the position of the black inkjet head (line head 20 discharging the black ink) is upstream or downstream in the conveyance direction of paper, the high image quality was obtained if the largest particle head among the color inkjet heads (head discharging the color inks other than black ink) is arranged at the most downstream of the conveyance direction of paper. In the following, possible factors will now be described.

The black ink is often used alone. This often results in that the ink amount per a dot (unit area) becomes equal to or less than 100% (the maximum discharge amount per a single head). Meanwhile, the color ink is often used for generating the predetermined color (color production by color mixture) in conjunction with another color ink. This often results in that the ink amount per a dot (unit area) exceeds 100% (the maximum discharge amount per a single head). As described above, it is believed that the ink amount of the black ink adhering to the conveyance roller is less than that of the color ink because of having a smaller ink amount per a dot (unit area). Thus, the print quality deterioration due to the ink re-adhering is caused mainly by the color ink. For this reason, it is believed that the arrangement of the color inkjet head rather than the black inkjet head greatly affects the image quality.

For the ink set, it is preferred that the difference between the number average particle diameters of the coated particles (resin-encapsulated pigment particle) in the color inks be equal to or more than 30 nm under the combination of the ink corresponding to the largest diameter difference. The employment of such ink set ensures that an image quality improvement (reduced print quality deterioration due to ink re-adhering) by the above-described arrangement of the color inkjet head is markedly effective. For example, in the ink sets A to E (Evaluations 1 to 5), as illustrated in FIGS. 9A to 11A, the ink combination that involves the largest diameter difference between the number average particle diameters of the coated particles in the color inks is a combination of the ink C-1 (the number average particle diameter 103 nm) and the ink Y-1 (the number average particle diameter 141 nm). The difference between the number average particle diameters is 38 nm. In the ink set F (Evaluation 6), as illustrated in FIG. 11B, the ink combination that involves the largest diameter difference between the number average particle diameter of the coated particle in the color inks is a combination of the ink M-2 (the number average particle diameter 99 nm) and the ink C-2 (the number average particle diameter 144 nm). The difference between the number average particle diameters is 45 nm.

While the above-described working example provides varying the ink color used in the respective line heads 20, it is desirable for an actual product (goods) to be configured such that each head discharges the ink of the same color at all times. Enabling an operator to change the ink color used in each line head 20 tends to cause the image quality deterioration due to the color mixture. Therefore, it is desirable to prevent anyone from setting (loading) an ink cartridge other than the predetermined color to each line head 20 by such as varying a shape of the ink cartridge accommodating member with respect to each line head 20 (each ink color).

The disclosure will not be limited to the above-described embodiment. For example, any modifications as described below can be implemented.

Regarding the configuration of the printer 100 (including components, size, materials, shape, or arrangement), any variation or omission may be made to the above-described embodiment without substantially departing from the spirit and principles of the disclosure.

The inkjet head includes not necessarily the line head but any head. For example, the inkjet head may include a sirial scan head, which discharges the ink with a reciprocation (shuttle movement) in a direction perpendicular to the conveyance direction of the paper.

If not required, the black inkjet head may be omitted. Alternatively, the image forming unit 200 may be constituted with the color inkjet head alone.

The ink-jet recording apparatus according to the disclosure is not limited to the color printer. A multi-functional peripheral (combination-type image forming apparatus), which has capabilities such as a scanner, a copier, a printer, and a facsimile, may be employed. In addition, the ink-jet recording apparatus according to the disclosure may be employed for applications other than the image formation.

Any combination of the above-described embodiment and a modification may be possible.

The ink-jet recording apparatus, an ink set for inkjet recording, and an inkjet recording method according to the disclosure are suitable for controlling the ink discharge of such as printer.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An ink-jet recording apparatus for recording on a recording sheet with an ink containing at least a pigment, a resin, and water, the ink-jet recording apparatus comprising:
   three color inkjet heads,
   wherein the three color inkjet heads, consisting of a first color inkjet head, a second color inkjet head and a third color inkjet head, are arranged in a conveyance direction of the recording sheet,
   the color inkjet head that discharges the ink containing resin-encapsulated pigment particles with a largest number average particle diameter among the three color inkjet heads is arranged in a most downstream of the conveyance direction of the recording sheet,
   the larger the number average particle diameters of the resin-encapsulated pigment particles contained in the inks discharged from the three color inkjet heads are, the more downstream side the color inkjet heads are arranged in the conveyance direction of the recording sheet,
   the first color inkjet head disposed most upstream among the three color inkjet heads discharges ink including resin-encapsulated pigment particles having the number average particle diameters of 99 nm to 103 nm,
   the second color inkjet head disposed between the first color inkjet head and a third color inkjet head discharges ink including resin-encapsulated pigment particles having the number average particle diameters of 118 nm to 120 nm,
   the third inkjet head disposed most downstream among the three color inkjet heads discharges ink including resin-encapsulated pigment particles having the number average particle diameters of 141 nm to 144 nm,
   the resin is a styrene acrylic resin having an acid value ranging from 150 to 300, and the ink includes 1,2-octanediol and Olfine E1010.

2. The ink-jet recording apparatus according to claim 1, wherein the recording sheet has a recording surface to be brought into contact with a conveyance roller after the ink discharge.

3. The ink-jet recording apparatus according to claim 1, wherein the inkjet head includes a long inkjet head.

4. The ink-jet recording apparatus according to claim 1, further comprising a black inkjet head.

5. A method for inkjet recording on a recording medium, used in an ink-jet recording apparatus including three color inkjet heads, the three color inkjet heads being arranged in a conveyance direction of a recording sheet, by discharging an ink containing at least a pigment, a resin, and water, the method comprising:
   when discharging the inks of three colors other than a black successively in order, lastly discharging the ink containing the resin-encapsulated pigment particle with a largest number average particle diameter among the inks of three colors from the color inkjet head arranged in a most downstream of the conveyance direction of the recording sheet among the three color inkjet heads, wherein when discharging the inks of three colors, including a first ink, a second ink and a third ink, other than the black successively in order, the more downstream the inks of three colors are discharged in the conveyance direction of the recording sheet, the larger the number average particle diameters of the resin-encapsulated pigment particles contained in the discharged inks become, firstly, discharging the first ink including resin-encapsulated pigment particles having the number average particle diameters of 99 nm to 103 nm from a first color inkjet head disposed most upstream among the three color inkjet heads, secondly, discharging the second ink including resin-encapsulated pigment particles having the number average particle diameters of 118 nm to 120 nm from a second color inkjet head disposed between the first color inkjet head and a third color inkjet head, thirdly, discharging the third ink including resin-encapsulated pigment particles having the number average particle diameters of 141 nm to 144 nm from the third inkjet head disposed most downstream among the three color inkjet heads, the resin is a styrene acrylic resin having an acid value ranging from 150 to 300, and the ink includes 1,2-octanediol and Olfine E1010.

* * * * *